United States Patent
O'Neill et al.

[11] Patent Number: 6,041,765
[45] Date of Patent: Mar. 28, 2000

[54] INTERNAL COMBUSTION ENGINE WITH AIR/FUEL RATIO CONTROL

[75] Inventors: Jeff S. O'Neill; Martin A. Iwamuro, both of Columbus, Ind.; John A. Connally, Farmington Hills, Mich.; Matthew S. Carroll, Nashville; Jim A. Zigan, Versailles, both of Ind.

[73] Assignee: Cummins Engine Company, Inc., Columbus, Ind.

[21] Appl. No.: 09/262,435

[22] Filed: Mar. 4, 1999

Related U.S. Application Data

[63] Continuation of application No. 08/579,839, Dec. 28, 1995, Pat. No. 5,904,131.

[51] Int. Cl.[7] .................................................. F02D 41/14
[52] U.S. Cl. ........................ 123/683; 123/527; 123/528; 123/684
[58] Field of Search ................... 123/478, 527, 123/528, 683, 684

[56] References Cited

U.S. PATENT DOCUMENTS

| | | | |
|---|---|---|---|
| 3,933,135 | 1/1976 | Zillman et al. | 123/557 |
| 4,098,248 | 7/1978 | Todd | 123/527 |
| 4,357,923 | 11/1982 | Hideg | 123/480 |
| 4,430,978 | 2/1984 | Lewis et al. | 123/527 |
| 4,537,172 | 8/1985 | Kanehara et al. | 123/527 |
| 4,541,397 | 9/1985 | Young | 123/527 |
| 4,638,783 | 1/1987 | Snyder | 123/527 |
| 4,641,625 | 2/1987 | Smith | 123/575 |
| 4,677,954 | 7/1987 | Ito et al. | 123/478 |
| 4,686,951 | 8/1987 | Snyder | 123/527 |
| 4,843,558 | 6/1989 | Bergmann et al. | 123/527 |
| 5,085,576 | 2/1992 | Bonne et al. | 431/22 |
| 5,150,690 | 9/1992 | Carter et al. | 123/527 |
| 5,255,657 | 10/1993 | Stellwagen | 123/527 |
| 5,337,722 | 8/1994 | Kurihara et al. | 123/527 |
| 5,353,765 | 10/1994 | Saikalis et al. | 123/438 |
| 5,355,855 | 10/1994 | Saikalis | 123/527 |
| 5,533,492 | 7/1996 | Willey et al. | 123/681 |
| 5,553,575 | 9/1996 | Beck et al. | 123/198 |
| 5,575,266 | 11/1996 | Iida | 123/680 |
| 5,595,163 | 1/1997 | Nogi et al. | 123/527 |
| 5,598,825 | 2/1997 | Neumann | 123/478 |
| 5,622,053 | 4/1997 | Freen | 60/603 |
| 5,904,131 | 5/1999 | O'Neill et al. | 123/683 |

FOREIGN PATENT DOCUMENTS

| | | |
|---|---|---|
| 0071588 | 2/1983 | European Pat. Off. . |
| 0510585 | 10/1992 | European Pat. Off. . |
| 6-101572 | 4/1994 | Japan . |

*Primary Examiner*—Tony M. Argenbright
*Attorney, Agent, or Firm*—Woodard, Emhardt, Naughton Moriarty & McNett Patent and Trademark Attorneys

[57] ABSTRACT

Engine (60) has manifold (62) and includes an air pathway (20) and a fuel line (30) coupled to the manifold (62) for supplying a fuel charge. Fuel line (30) has a controllable valve (40) for regulating fuel flow and a first sensor (38) providing a fuel signal corresponding to mass flow rate of fuel through the fuel line. A second sensor (65) provides a speed signal corresponding to rotational speed of the engine. A third sensor (63) provides a temperature signal corresponding to temperature within the manifold. A fourth sensor (64) provides a pressure signal corresponding to pressure within the manifold. A fifth sensor (76) provides an exhaust signal corresponding to air/fuel ratio for combusted air and fuel in the exhaust pathway. A controller (80) responsive to the controllable valve (40) and sensors (38), (63), (64), (65), and (76) determines an air signal corresponding to the mass flow rate of air through the air pathway (20) as a function of the speed signal, temperature signal, and pressure signal. The controller actuates a valve control signal in accordance with the air signal, fuel signal, and exhaust signal to actuate fuel control valve actuator (42).

26 Claims, 6 Drawing Sheets

INTERNAL COMBUSTION ENGINE WITH AIR/FUEL RATIO CONTROL

CROSS REFERENCE TO RELATED APPLICATIONS

The present application is a continuation of U.S. patent application Ser. No. 08/579,839, filed Dec. 28, 1995, now U.S. Pat. No. 5,904,131.

BACKGROUND OF THE INVENTION

A. Field of the Invention

The present invention relates generally to fuel management systems for internal combustion engines and, more particularly, to an air/fuel ratio management system for an internal combustion engine utilizing a gaseous fuel.

B. Description of the Prior Art

In order to obtain optimum engine operation, modern day internal combustion engines monitor the air/fuel ratio of the fuel charge to the engine to optimize engine performance. Careful monitoring of the air/fuel ratio of the fuel charge is necessary to obtain best fuel economy and low engine emissions. As used herein, "fuel charge" is the mixture of fuel and air provided to the engine for combustion.

There is also a trend to employ gaseous fuel with internal combustion engines. As used herein, a "gaseous fuel" means a fuel which is in the gaseous state at standard temperature and pressure. A few examples of a gaseous fuels used with internal combustion engines are: compressed natural gas, liquid natural gas, and liquid petroleum gas. Gaseous fuel internal combustion engines which carefully manage the air/fuel ratio are of particular benefit in heavy duty trucks.

In order to monitor the air/fuel ratio for a gaseous fuel internal combustion engine, typically an air/fuel ratio sensor, commonly an oxygen sensor, is exposed to combustion products in the exhaust gas stream of the engine. The amount of oxygen in the combustion products of a fuel charge is indicative of the air/fuel ratio of that fuel charge just prior to combustion.

One disadvantage of an air/fuel ratio sensor in the exhaust stream is that feedback to a control system is limited to the fuel charge which has already been expended. Consequently, the delay imposed between engine combustion and air/fuel ratio sensor detection results in less than optimum engine performance—especially during transient engine operating conditions.

Some existing gaseous engine systems add more sensors to provide improved control. Specifically, a gas mass flow rate sensor is added to the gaseous fuel line and an air mass flow rate sensor is added to the air intake pathway upstream of the engine manifold. Typically, an input air/fuel ratio is determined from these extra sensors which can be used to control air/fuel ratio alone, or in conjunction with the more traditional exhaust air/fuel ratio sensor. Although these systems usually provide more effective control over the engine's air/fuel ratio, it is only at the expense of these additional sensors. Furthermore, these sensors are detrimental to the reliability of this system because they increase the number of likely failure points.

Existing systems also suffer from other limitations. For example, the poppet-type valve commonly used to regulate fuel flow in gaseous engines requires a relatively high gaseous fuel pressure to operate effectively. However, lower fuel line pressure is more cost effective for some applications.

Consequently, a need remains for a gaseous internal combustion engine that employs the more effective air/fuel ratio control obtained with air/fuel ratio sensing at the engine input, but without adding two extra sensors. Also, if it is desirable to use a low pressure gaseous fuel source with such an engine, then the problem of effectively regulating low pressure gaseous fuel flow still needs to be solved.

SUMMARY OF THE INVENTION

The present invention provides improvements to systems and processes for controlling the air/fuel ratio of spark-ignited engines. One feature of the present invention is a control system responsive to sensed air mass flow and fuel mass flow inputs to an engine which does not require a dedicated air mass flow rate sensor. Instead the system senses air mass flow from other sensors using an established relationship, such as the speed density equation.

An internal combustion engine embodying this feature has a manifold and is configured to combust a mixture of air and gaseous fuel. The engine includes an air pathway coupled to the manifold for supplying air and a fuel line coupled to the manifold for supplying gaseous fuel. The fuel line has a controllable valve for regulating fuel flow through the fuel line and a first sensor providing a fuel signal corresponding to mass flow rate of fuel through the fuel line. A second sensor provides a speed signal corresponding to rotational speed of the engine. A third sensor provides a pressure signal corresponding to pressure within the manifold. A fourth sensor provides a temperature signal corresponding to temperature within the manifold. A controller responsive to the controllable valve and the first, second, third, and fourth sensors determines an air signal corresponding to the mass flow rate of air through the air pathway as a function of the speed, pressure, and temperature signals. The controller provides a valve control signal in accordance with the air signal and the fuel signal. The controllable valve is responsive to this valve control signal to adjust the rate of fuel flow through the fuel line.

Another feature of the present invention is a process which includes the steps of sensing engine speed, manifold pressure, manifold temperature, and fuel mass flow rate. Another step of the process is determining air mass flow rate as a function of sensed engine speed, manifold pressure, and manifold temperature. Yet another step is controlling fuel flow through the fuel line in accordance with air mass flow rate and sensed fuel mass flow rate.

Still another feature of the present invention is an engine, which employs an exhaust stream sensor and an input gas mass flow sensor, and derives input air mass flow from the engine speed and a manifold signal corresponding to one of temperature or pressure within the manifold. The air/fuel ratio control of this engine is performed in accordance with the sensed fuel mass flow, air mass flow, and air/fuel ratio from the exhaust stream.

Yet another feature of the present invention is the application of a rotary actuated butterfly valve responsive to a valve control signal to provide regulation of fuel flow through the fuel line. This feature provides for the use of a relatively low pressure fuel line. A controller may provide the actuating signal to the butterfly valve in accordance with an air/fuel ratio control system.

Thus, one primary object of the present invention is to provide an improved air/fuel ratio control system for a spark-ignited engine which responds to sensed fuel mass flow and air mass flow without resort to a dedicated air mass flow sensor.

Another object of the present invention is to incorporate an exhaust air/fuel ratio sensor into this system.

Still another object of the present invention is to provide for operation at low gaseous fuel line pressures.

Further objects and advantages of the present invention will be apparent from the accompanying drawings and description.

DESCRIPTION OF THE PREFERRED EMBODIMENT

Figure 1:
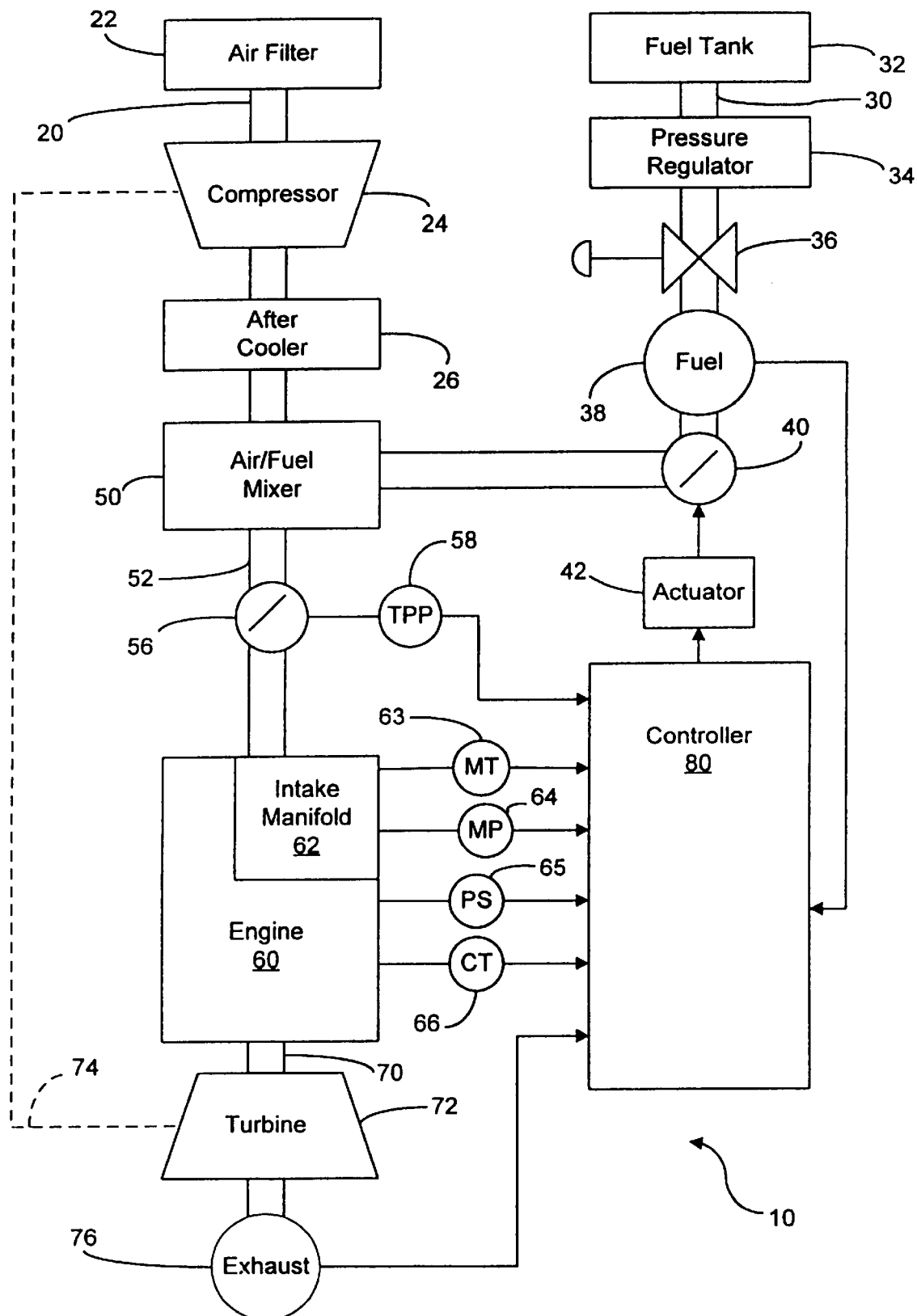
FIG. 1 is a diagrammatic view illustrating a preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, any alterations and further modifications in the illustrated device, or further applications of the principles of the invention as illustrated therein being contemplated as would normally occur to one skilled in the art to which the invention relates.

FIG. 1 illustrates one preferred embodiment of a system 10 for practicing the present invention. One beneficial application of this system is in a heavy duty truck. Generally, system 10 includes an air pathway 20 and a fuel line 30 which are in fluid communication with an air/fuel mixer 50. The air/fuel ratio in mixer 50 is regulated by a controllable fuel valve 40 situated in fuel line 30. A mixture of air and fuel from mixer 50 provides a fuel charge for ignition by an engine 60 in fluid communication with mixer 50. The combusted fuel charge exits the engine along an exhaust pathway 70. The controller 80 monitors various aspects of system 10 and adjusts fuel control valve 40 accordingly.

Air pathway 20 includes air filter 22 which filters air supplied to a compressor 24. Compressor 24 generally increases pressure of air flowing therethrough. Compressor 24 may be of a standard turbo-charger configuration. The pressurized air from compressor 24 then flows along air pathway 20 through a charge air cooler or after cooler 26 of a conventional type. After cooler 26 is in fluid communication with the air/fuel mixer 50. In alternate embodiments, a controllable waste gate valve may be employed along air pathway 20 between compressor 24 and mixer 50 to regulate air pressure.

Fuel line 30 includes a gaseous fuel tank 32 for holding an appropriate gaseous fuel which is typically compressed or liquified. Tank 32 is in fluid communication with pressure regulator 34. Typically, fuel from tank 32 is vaporized in a known manner. The vaporized fuel flows along fuel line 30 and fuel pressure is regulated by pressure regulator 34 in a manner known to those skilled in the art. The fuel continues to flow along fuel line 30 through an emergency cut-off valve 36 to a fuel sensor 38. Fuel sensor 38 supplies a fuel signal to controller 80 indicative of gas mass flow rate through fuel line 30. Fuel sensor 38 may be of the hot wire anemometer type, or other types well known in the art.

Next fuel continues along fuel line 30 to fuel control valve 40. Controller 80 controls fuel control valve 40 via actuator 42 to correspondingly regulate the flow of fuel to mixer 50. In one embodiment, fuel control valve 40 is a poppet-type valve linearly actuated by electromagnetic means in proportion to the pulse width of a square wave signal from controller 80 like that shown in U.S. Pat. No. 4,537,172 to Kanehara et al. which is hereby incorporated by reference. However, because this type of fuel control valve requires a relatively high fuel line pressure, the present invention also contemplates using a known butterfly-type valve for fuel control valve 40 which is configured for rotary actuation by by controller 80. Unlike a linear solinoid poppet-type fuel valve, a butterfly valve does not require a high fuel line pressure. The rotary actuation of a butterfly valve may be accomplished electromagnetically in response to a signal from controller 80.

A mixture of air and regulated fuel flows from mixer 50 along fuel charge pathway 52 to throttle valve 56. Throttle valve 56 may be of a standard butterfly type which is responsive to an operator-controlled throttle plate. Sensor 58 is coupled to controller 80 to provide a throttle position signal TPP. In one embodiment, an idle by-pass valve responsive to controller 80 is included in parallel with throttle valve 56 to provide a minimum fuel charge for maintaining engine idle as appropriate.

A fuel charge enters manifold 62 of engine 60 from mixer 50 along fuel charge pathway 52 and is then ignited. Sensor 63 is coupled to controller 80 to provide a manifold temperature signal, MT. Sensor 64 is coupled to controller 80 to provide a manifold pressure signal, MP. Engine position sensor 65 is coupled to controller 80 to provide signal PS. Signal PS is indicative of the position of the engine cam shaft by use of a variable reluctance sensor and fixed teeth located on the engine cam shaft gear. Controller 80 may use the frequency of signal PS to determine rotational speed of engine 60. Sensor 66 is coupled to controller 80 to provide engine coolant temperature signal CT.

Combustion products from engine 60 form an exhaust stream which flows along exhaust pathway 70 and drives turbine 72. In turn, turbine 72 drives compressor 24 via a mechanical linkage 74. The exhaust stream is monitored by sensor 76 which is coupled to controller 80 to provide an exhaust signal. In one preferred embodiment, sensor 76 detects oxygen level in the exhaust gases indicative of the air/fuel ratio prior to combustion.

Controller 80 may be an electronic circuit comprised of one or more components. Similarly, controller 80 may be comprised of digital circuitry, analog circuitry, or both. Controller 80 may be a programmable digital or analog processor, or a hybrid combination of both. However, controller 80 is preferably a microprocessor based controller of known construction.

Sensors 38, 58, 63–66 and 76 may provide a signal in either a digital or analog format to controller 80. Correspondingly, controller 80 is configured to condition and convert sensor signals to the appropriate format, as required. All sensors of system 10 are of a known construction.

Figure 2:
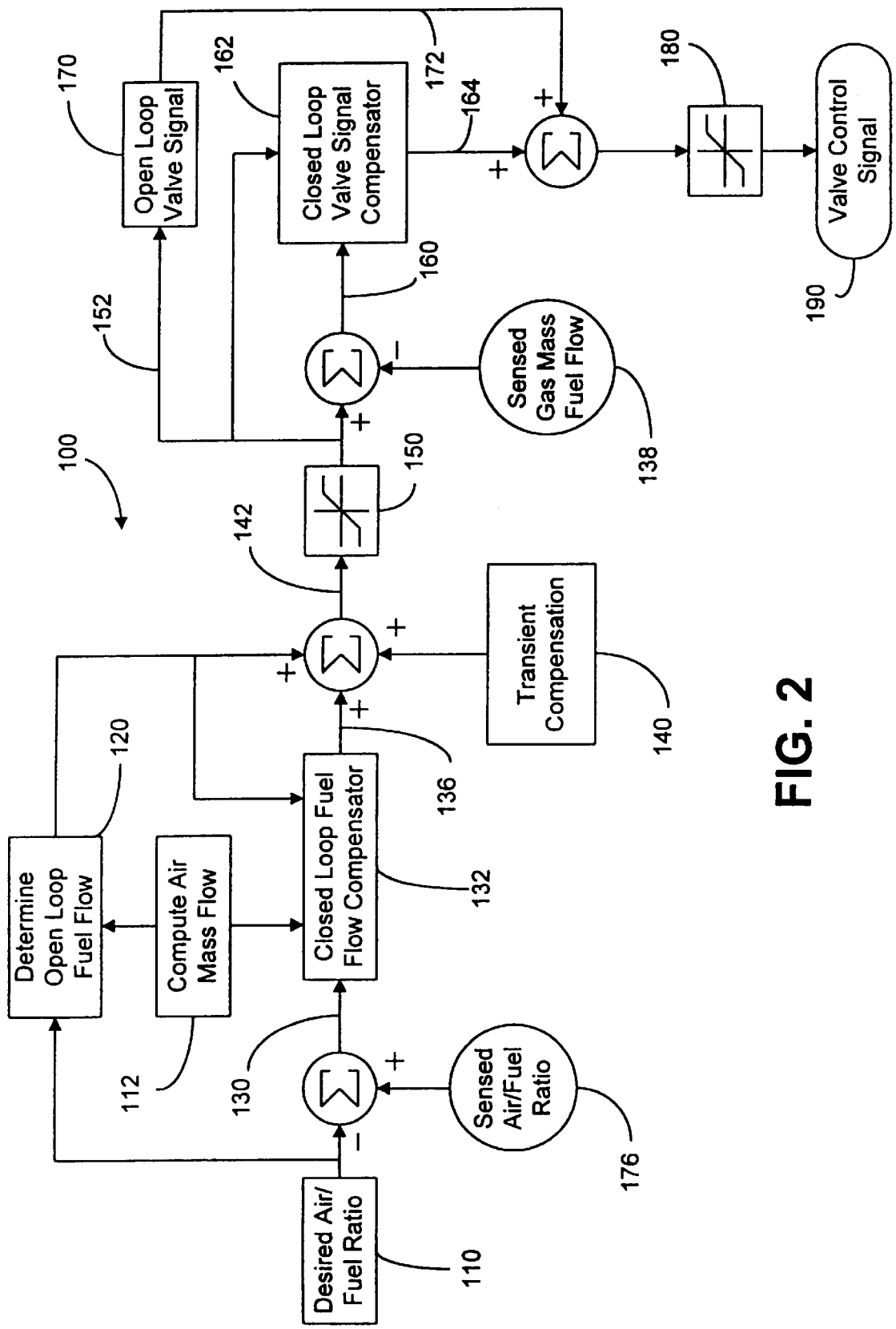
FIG. 2 is a control system block diagram for the preferred embodiment of FIG. 1.

FIG. 2 depicts a control system 100 to control the engine system 10 of the present invention. Control system 100 is based on a requested target or desired air/fuel ratio indicated as input 110. Operator 120 receives the desired air/fuel ratio for conversion to an open loop fuel flow signal, as a function of air mass flow rate.

Instead of relying on an air mass flow rate sensor to provide a corresponding signal, the present invention derives air mass flow rate from other sensors common to an engine. For example, the speed density equation provides air mass flow rate using sensor signals indicative of engine speed, manifold pressure, and manifold temperature. Specifically, the speed density equation provides air mass flow rate, Ma, as follows:

$$Ma = \frac{Ve * Vd * n * P}{2 * R * T}$$

where: Ve=volumetric efficiency of the given engine;
Vd=volumetric displacement of the given engine;
n=engine speed;
P=manifold pressure;
R=ideal gas constant; and
T=manifold temperature.

Notably, the three independent variables; n, T, and P may be determined by the engine sensor signals PS, MT and MP, respectively as discussed in connection with FIG. 1. The open loop fuel flow operator 120 is determined by dividing Ma by the desired air/fuel ratio. In alternate embodiments, n, T, or P may be considered constant so that only two sensors are necessary to provide Ma.

Besides the open loop signal provided by operator 120, a closed loop fuel flow signal is also provided. This loop begins by comparing the desired air/fuel ratio signal to the sensed air/fuel ratio input 176. The sensed air/fuel ratio may be determined from the Exhaust signal supplied by sensor 76 of engine system 10 as shown in FIG. 1. The result of this comparison is a fuel flow error 130=sensed air/fuel ratio of input 176–desired air/fuel ratio of input 110. Compensator 132 further refines and limits this error term as a function of Ma and the open loop fuel signal output by operator 120 to provide a closed loop fuel flow signal 136. Compensator 132 dampens large changes in the error to minimize noise sensitivity and enhance stability. Furthermore, in the preferred embodiment, it is assumed that any difference in the air mass flow for the desired and sensed air/fuel ratios is negligible; so that the error term can generally be attributed to a change in desired versus measured fuel mass flow.

The open loop and closed loop fuel flow signals are summed with an engine transient compensator 140 to provide a target fuel flow signal 142. Transient compensator 140 accounts for transients which might adversely impact control. Such transients may result from changes in throttle position or engine idle control. In effect, the open loop fuel flow signal is a feed forward term which is trimmed by the closed loop compensated fuel flow signal to account for variation in engine design parameters over time. Furthermore, the closed loop system, properly compensated, provides for overall control system stability. However, in the event of failure of an exhaust air/fuel sensor, the feed forward open loop fuel flow signal can provide for a "limp-home" capability at the possible sacrifice of efficiency.

The target gas mask flow signal 142 is fixed within a pre-determined range by limiter 150 to produce a limited gas mass fuel flow signal 152 which is then fed forward to operator 170 for conversion to an open loop control valve signal 172. The limited target gas mass fuel flow signal 152 is compared to the sensed gas mass fuel flow 138. The sensed gas mass fuel flow signal 138 may be determined from the fuel signal of sensor 138 shown in FIG. 1. A fuel flow error term 160 is determined by comparing signal 152 to signal 138 where: error term 160=signal 152–signal 138. Compensator 162 provides for compensation of error term 160 as a function of signal 152 to provide a closed loop control valve signal 164. The open loop control valve signal 172 and closed loop control valve signal 164 are summed and limited by limiter 180 to provide a valve control signal 190. Valve control signal 190 may be coupled to actuator 42 shown in FIG. 1 to correspondingly regulate fuel flow through fuel flow control valve 40.

The control system 100 may be implemented using linear or discrete control techniques and associated hardware. Naturally, controller 80 will be configured to correspond to the particular configuration selected when used to implement control system 100. FIGS. 3A, 3B, 4A, and 4B provide flow charts for stepwise implementation of a software routine for implementing control system 100, in accordance with one aspect of the present invention.

Figure 3A:
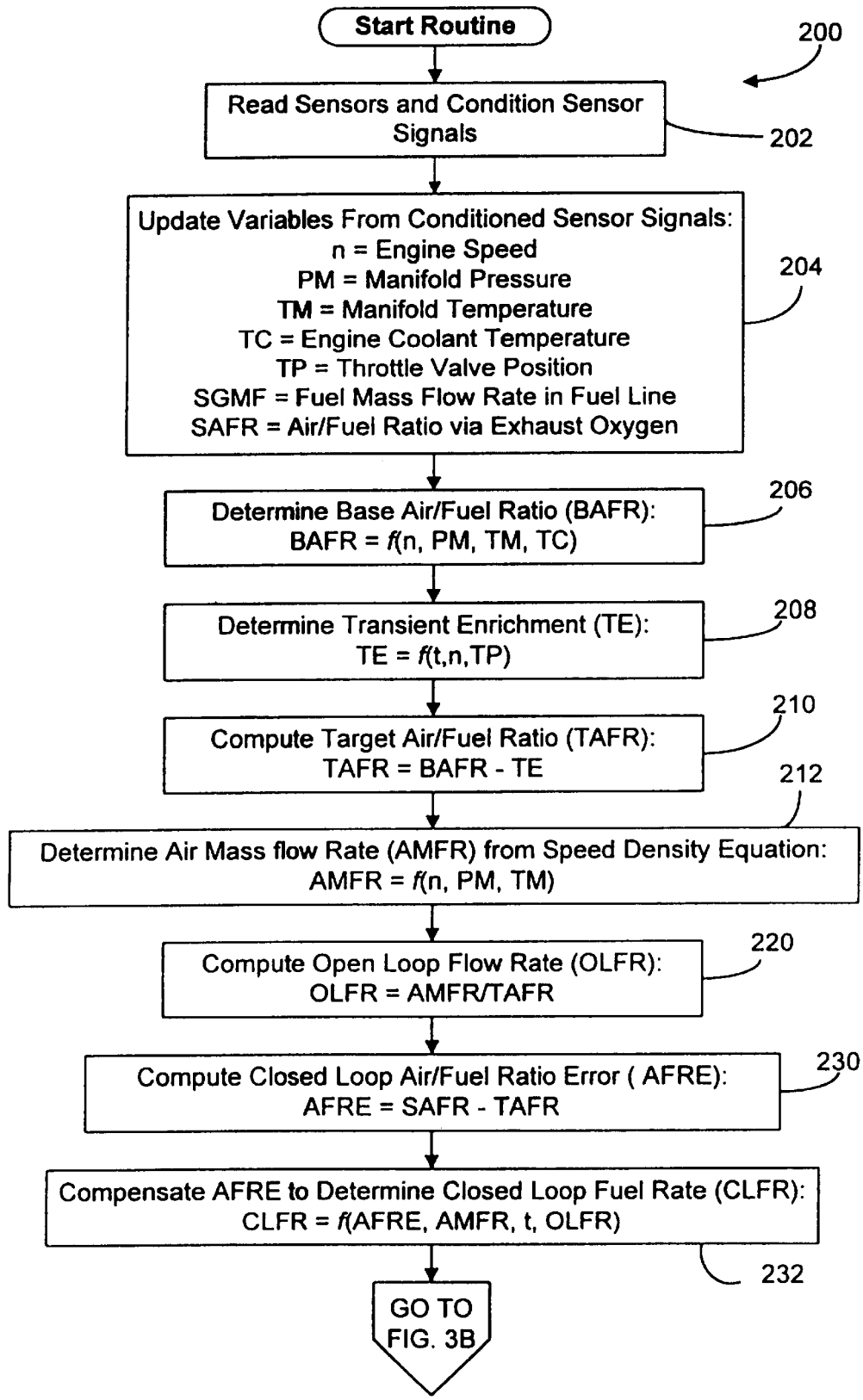
FIG. 3A is a flow chart illustrating a control system routine for the control system shown in FIG. 2.
Figure 3B:
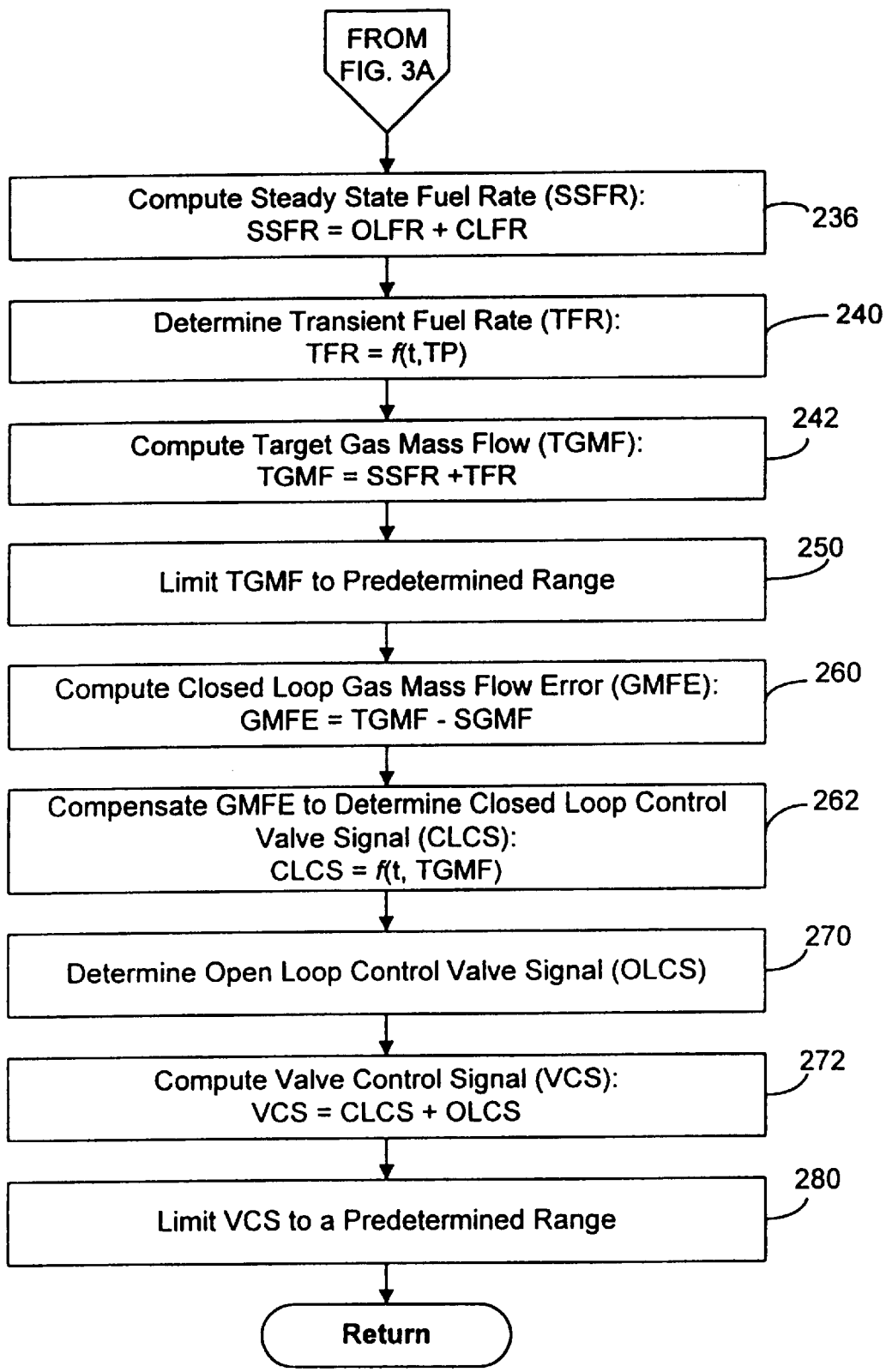
FIG. 3B is a continuation of the flow chart of FIG. 3A.

FIG. 3A shows the start of routine 200 for implementing control system 100 which is performed periodically. Routine 200 concludes as shown in FIG. 3B. In step 202 of FIG. 3A, system sensors are read and conditioned appropriately. Step 202 includes formatting and conversion processes of sensor signals as required. For example, the fuel signal from sensor 38 of FIG. 1 may be linearized by application of a dedicated look-up table and low pass filtered by a difference equation operation. Similarly, the exhaust signal from sensor 76 of FIG. 1 may be subjected to a calibration procedure to account for sensor variability, linearization through application of a look-up table, and low pass filtering.

In step 204, program variables are updated with values corresponding to sensor signals. For an embodiment using an engine position sensor, rotational engine speed n is determined by counting the frequency of the positioning pulse and dividing by an appropriate time base. The manifold pressure is assigned to PM. The manifold temperature is assigned to TM. Engine coolant temperature is assigned to TC. Throttle position is assigned to TP as a percentage value. Similarly, a conditioned input fuel mass flow rate signal is assigned to sensed gas mass flow (SGMF) and a conditioned exhaust air/fuel ratio signal is assigned to sensed air/fuel ratio (SAFR).

In step 206, a base air/fuel ratio (BAFR) is determined as a function of n, PM, TM, and TC. In one preferred embodiment, the BAFR is determined by adding three separate terms. A 3-D look-up table provides the initial term which is selected in correspondence to entry variables n and PM. The second term provides manifold temperature compensation and results from entry into a dedicated look-up table with MT. A third term provides coolant temperature compensation and is derived by application of a hysteresis function relative to TC.

Step 208 provides for transient enrichment (TE) of BAFR as a function of time, n, and TP. This function is designed to provide added torque for large increases in throttle position (TP). Torque is increased by providing a richer fuel charge which is correspondingly accomplished by decreasing the air/fuel ratio. In one preferred embodiment, TE is triggered by a threshold TP change and provided as an exponentially decaying signal with a rate of decay dependent on n.

In step 210, a desired or target air/fuel ratio (TAFR) is computed as: TAFR=BAFR–TE, to provide a corresponding increase in fuel charge richness. In step 212, the speed density equation is applied to determine air mass flow rate (AMFR). The equation is represented as AMFR=constant * (Ve * AvgRPM * PM)/(TM+459.67). The volumetric efficiency (Ve), is interpolated from a 3-D engine characteristic table which is entered with variables n and PM. The TM value is normalized to the Rankine scale by addition of 459.67. AvgRPM is a time average determination of n.

The open loop fuel rate (OLFR) is computed in step 220 as:

$$OLFR = \frac{AMFR}{TATR}.$$

In step 230, a closed loop air/fuel ratio error (AFRE) is determined by subtracting the target air/fuel ratio (TAFR) from the sensed air/fuel ratio (SAFR). Because it is assumed that changes in air mass flow rate are negligible, this error term is generally indicative of error in fuel or gas mass flow rate. In step 232, this error rate is compensated to dampen transients. The resulting compensated value is the closed loop flow rate (CLFR).

Figure 4A:
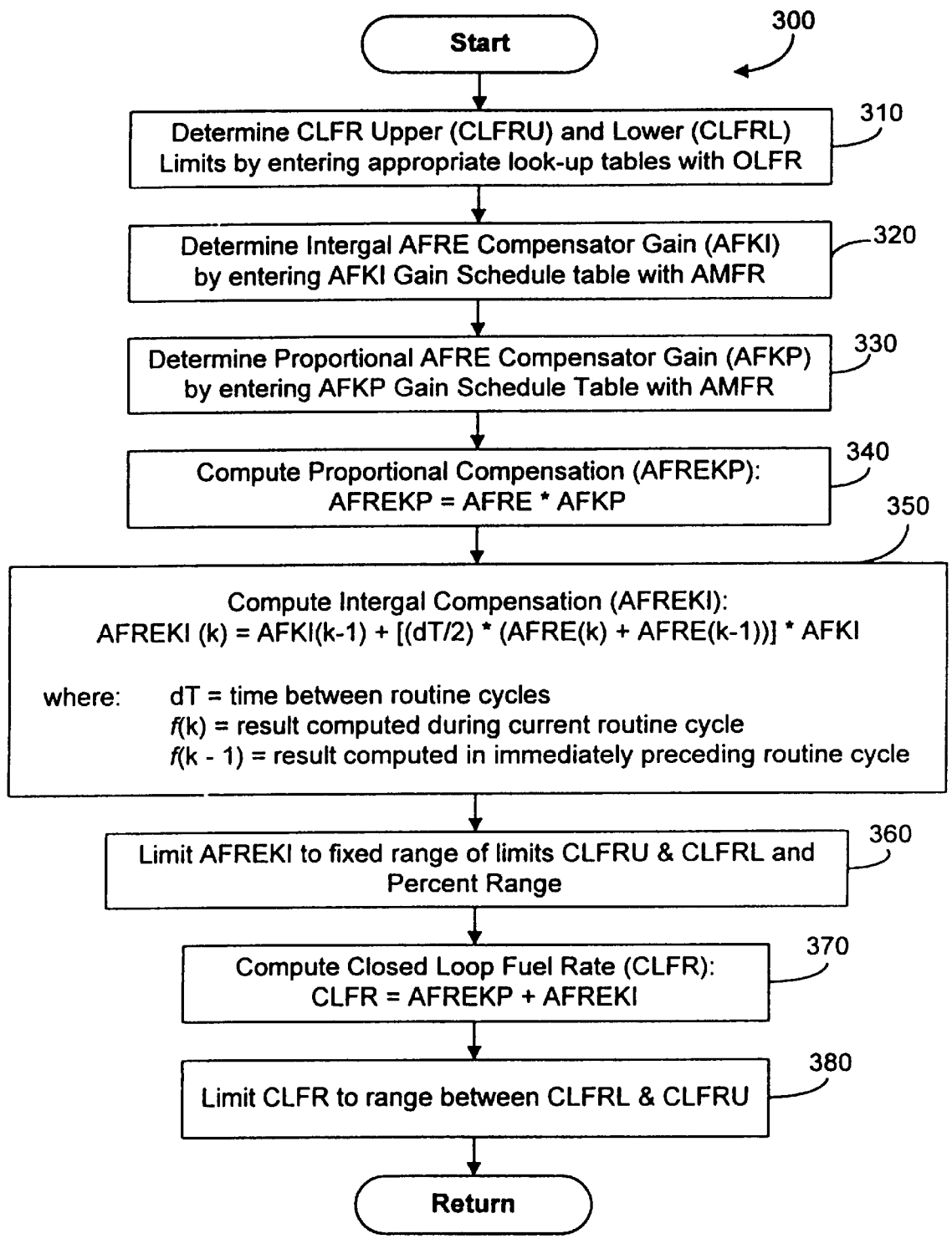
FIG. 4A is a flow chart illustrating in further detail a step shown in FIG. 3A.

Referring to FIG. 4A, one preferred embodiment for performing the air/fuel ratio error compensation of step 232 is shown as routine 300. Routine 300 reveals a proportional plus integral (P.I.) compensator with various limiting functions. In step 310 of routine 300, an upper closed loop flow rate limit (CLFRU) and a lower closed loop flow rate limit (CLFRL) are determined by entry into appropriate look up tables with the open loop flow rate value (OLFR) from step 220. These values are used in later steps of the routine.

In step 320, an integral compensator gain AFKI is determined by entering a look up table of a function of air mass flow rate (AMFR) determined in step 212. Similarly, in step 330, a proportional compensator gain AFKP is determined by entry into an appropriate look up table with AMFR.

Accordingly, in step 340 a proportional compensator term AFREKP is computed as AFREKP=AFRE * AFKP. In step 350, an integral error compensator term is computed as: AFREKI(k)=AFKI(k−1)+[(dT/2) * (AFRE(k)+AFRE(k−1))] * AFKI where: dT=time between routine cycles;
k=result computed during current routine cycle; and
k−1=result computed in immediately preceding routine cycle.

In step 360, AFREKI is further limited to a fixed range between CLFRU and CLFRL and may also be limited by a percentage function. The integral term AFREKI is then summed with the proportional term, AFREPK, to provide closed loop fuel flow rate, CLFR in step 370. In step 380, CLFR is further limited to the range defined by CLFRU and CLFRL. The routine 300 then returns control to the calling routine.

Referring back to FIG. 3A, the computation of CLFR in step 232 is followed by step 236 shown in FIG. 3B. In step 236, a steady state fuel flow or fuel rate (SSFR) is computed as the sum of the feed forward and compensated closed loop variables, OLFR and CLFR, as determined in steps 220 and 232, respectively.

In step 240, a transient fuel rate term (TFR) is determined as a function of time, TP, and idle status. Unlike the transient enrichment in step 208, the TFR determination is concerned with smaller transients. For example, air mass flow rate disturbances may result from throttle position changes because of manifold filling dynamics. SAFR cannot compensate for such disturbances due to transport delay through engine. Consequently, TFR is used to add or subtract fuel in proportion to high frequency movements of the throttle (or additionally a by-pass valve provided for idling control, if one is used).

In step 242, a target gas mass flow (TGMF) is computed by adding SSFR and TFR. Subsequently, TGMF is limited to a fixed range in step 250. In step 260, a gas mass flow rate error (GMFE) is computed by subtracting the sensed gas mass flow rate (SGMF) from the target gas mass flow rate (TGMF). This error term is compensated in step 262 as a function of time and TGMF to provide a closed loop valve control signal (CLCS).

Figure 4B:
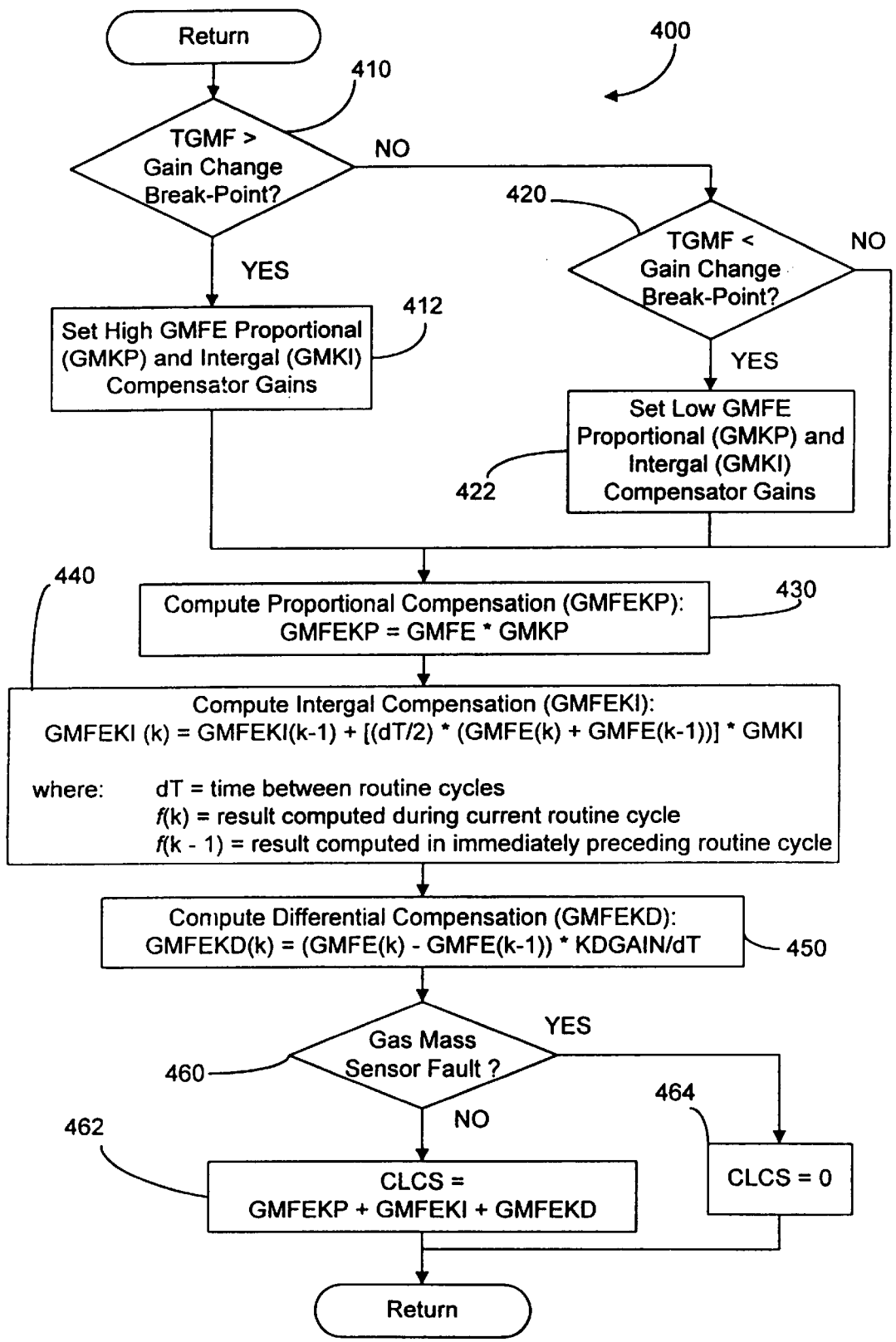
FIG. 4B is a flow chart illustrating in further detail a step shown in FIG. 3B.

Referring to FIG. 4B, one preferred embodiment for performing step 262 compensation is depicted as routine 400. Routine 400 is generally a proportional plus integral plus derivative compensator (P.I.D.) which reduces noise sensitivity and improves stability. In step 410 of routine 400, a conditional is encountered which tests whether TGMF is greater than a given gain change break-point. If TGMF exceeds this break-point, then proportional and integral compensator gains, GMKP and GMKI, respectively are set to a maximum value in step 412. If TGMF does not exceed this break-point, then a second conditional of step 420 is encountered which tests whether TGMF is less than a given gain change break-point. If TBMF is not less than the given gain change break-point, then GMKP and GMKI are set to a minimum gain in step 422. Otherwise, GMKP and GMKI do not change and control flows to step 430. The gain change break-point may be determined as a function of a fixed threshold and a term which introduces a level of gain hysteresis.

In step 430, the proportional compensator term is computed as GMFEKP=GMFE * GMKP. In step 440, the integral compensator term is calculated as GMFEKI(k)= GMFEKI(k−1)+[(dT/2) * (GMFE(k)+GMFE(k−1))] * GMKI. In step 450, the differential compensation term is calculated as GMFEKD(k)=(GMFE(k)−GMFE(k−1)) * KDGAIN/dT where the differential compensator term gain is the constant, KDGAIN.

In step 460, a conditional is encountered which tests whether the gas mass flow rate sensor has failed. If it has, then the closed loop value control signal, CLCS, is set to zero in step 464. If no sensor fault is detected, then CLCS is computed as the sum of the compensator terms: CLCS= GMFEKP+GMFEKI+GMFEKD in step 462. Routine 400 then returns to the calling routine.

Referring back to FIG. 3B, after compensation and determination of CLCS in step 262, step 270 is encountered in which an open loop valve control signal (OLCS) is determined by reference to a look-up table of fuel flow rate versus valve control signal values. The feed forward signal, OLCS, provides a "limp home" capability in the event of gas mass flow rate sensor failure. In step 272, a composite valve control signal (VCS) is computed as: VCS=CLCS+OLCS. In step 280, VCS is limited to a fixed range. In a preferred embodiment using a proportional poppet-type valve with a solenoid electromagnetic control, VCS is a percentage duty cycle pulse width modulated (PWM) signal. For another preferred embodiment using a rotary actuated butterfly-type valve, VCS is a voltage level corresponding to rotary position. After step 280 of Routine 200, control then returns to the calling routine.

It should be noted that certain steps of the routines depicted in FIGS. 3A, 3B, 4A and 4B may be performed more often than others or otherwise varied as would occur to one skilled in the art. For example, in one embodiment, the sensors are read and variables updated in steps 202 and 204 more or less often than other steps of the routine. In another embodiment, routine 200 is generally executed on a fixed time rate schedule of about 20 Hz but having a 100 Hz rate for conditioning and averaging MP and SGMF, and a 33.3 Hz rate for determining, filtering and scaling of SGMF, computing TFR, and performing various logic functions associated with the conditioning VCS for use as an actuating signal. Furthermore, in other embodiments, the routine may be executed as an interrupt routine with or without a fixed execution schedule.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system, comprising:
   an internal combustion engine including a manifold, an air pathway coupled to said manifold to supply air, and a fuel line coupled to said manifold to supply gaseous fuel, said fuel line including a controllable valve for regulating fuel flow therethrough;
   a first sensor providing a first signal corresponding to mass flow rate of fuel through said fuel line;
   a second sensor providing a second signal corresponding to rotational speed of said engine;
   a third sensor providing a third signal corresponding to pressure within said manifold;
   a fourth sensor providing a fourth signal corresponding to temperature within said manifold;
   a controller responsive to said first, second, third, and fourth signals to determine a fifth signal as a function of said second, third, and fourth signals corresponding to air mass flow rate through said air pathway, and generate an sixth signal in accordance with said first and fifth signals; and
   wherein said controllable valve is a rotary actuated butterfly valve, actuation of said butterfly valve being limited to a predetermined range, and said controllable valve is responsive to said sixth signal to adjust the rate of fuel flow through said fuel line.

2. The system of claim 1, further comprising:
   an air/fuel mixer in fluid communication with said pathway, said fuel line, and said manifold, said mixer being operable to supply a mixture of fuel and air to said manifold for combustion;
   a throttle valve in fluid communication with said mixer and said manifold and being positioned therebetween, said throttle for regulating flow of the mixture to said manifold; and
   a fifth sensor providing a throttle signal corresponding to position of said throttle valve, said controller being responsive to said throttle signal to further control performance of said engine.

3. The system of claim 1, wherein said engine has an exhaust pathway with a fifth sensor to provide an exhaust signal corresponding to air/fuel ratio of a combusted mixture of air and fuel, and said valve control signal is further provided in accordance with said exhaust signal.

4. The system of claim 1, wherein said function corresponds to the speed-density equation.

5. The system of claim 1, wherein said controller includes means for compensating for transient operation of said engine.

6. The system of claim 1, wherein said engine has an exhaust pathway with a fifth sensor to provide an exhaust signal corresponding to an observed air/fuel ratio of a combusted mixture of air and fuel, and said controller is responsive to said exhaust signal to compare said exhaust signal to a target air/fuel ratio signal and determine a target fuel mass flow rate from said target air/fuel ratio signal.

7. The system of claim 1, further comprising:
   a mixer in fluid communication with said pathway, said fuel line, and said manifold, said mixer providing a mixture of fuel and air to said manifold;
   a throttle valve in fluid communication with said mixer and said manifold and being positioned therebetween to regulate flow of the mixture to said manifold;
   a compressor in fluid communication with said pathway for supplying pressurized air to said mixer;
   an after cooler in fluid communication with said compressor and said mixer and being positioned therebetween; and
   a fifth sensor providing a throttle control signal corresponding to position of said throttle valve, said controller being responsive to said fifth signal to further control performance of said engine.

8. The system of claim 7, wherein said engine has an exhaust pathway with a fifth sensor to provide an exhaust signal corresponding to air/fuel ratio of a combusted mixture of air and fuel, and said valve control signal is further provided in accordance with said exhaust signal.

9. The system of claim 8, wherein said controller includes means for determining a target fuel mass flow rate from said exhaust signal and a target air/fuel ratio.

10. The system of claim 9, wherein said controller includes means for compensating for transient operation of said engine.

11. The system of claim 10, wherein said function corresponds to the speed-density equation.

12. The system of claim 2, wherein said engine has an exhaust pathway with a fifth sensor to provide an exhaust signal corresponding to air/fuel ratio of a combusted mixture of air and fuel, and said valve control signal is further provided in accordance with said exhaust signal.

13. The system of claim 2, wherein said function corresponds to the speed-density equation.

14. The system of claim 2, wherein said controller includes means for compensating for transient operation of said engine.

15. The system of claim 3, wherein said controller includes means for determining a target fuel mass flow rate from said exhaust signal and a target air/fuel ratio.

16. A system, comprising:
    an internal combustion engine including a manifold, an air pathway coupled to said manifold for supplying air, and a fuel line coupled to said manifold for supplying gaseous fuel, said fuel line including a rotary actuated butterfly valve for regulating the flow of fuel through said fuel line;
    a first sensor providing a first signal corresponding to mass flow rate of fuel through said fuel line;
    a second sensor providing a second signal corresponding to rotational speed of said engine;
    a third sensor providing a third signal corresponding to air mass flow rate through said air pathway;
    a controller responsive to said butterfly valve and said first, second, and third signals to provide a valve control signal; and
    wherein said butterfly valve is responsive to said valve control signal to adjust fuel flow through said fuel line, actuation of said butterfly valve is limited to a predetermined range, and said valve control signal is determined in accordance with an air/fuel ratio.

17. The system of claim 16, further comprising:
    a mixer in fluid communication with said pathway, said fuel line, and said manifold, said mixer providing a mixture of fuel and air to said manifold;
    a throttle valve in fluid communication with said mixer and said manifold and being positioned therebetween to regulate flow of the mixture to said manifold; and a compressor in fluid communication with said pathway for supplying pressurized air to said mixer; and an after cooler in fluid communication with said compressor and said mixer and being positioned therebetween; and a fourth sensor providing a fourth signal corresponding to position of said throttle valve, said controller being responsive to said fourth signal to further control performance of said engine.

18. The system of claim 16, wherein said engine has an exhaust pathway with a fourth sensor to provide an exhaust signal corresponding to the air/fuel ratio of a combusted mixture of air and fuel, and said valve control signal is further provided in accordance with said exhaust signal.

19. The system of claim 16, wherein said controller includes means for compensating for transient operation of said engine.

20. The system of claim 16, wherein said engine has an exhaust pathway with a fourth sensor to provide an exhaust signal corresponding to an observed air/fuel ratio of a combusted mixture of air and fuel, and said controller is responsive to said exhaust signal to compare said exhaust signal to a target air/fuel ratio signal, and determine a target fuel mass flow rate from said target air/fuel ratio signal.

21. The system of claim 16, wherein said engine has an exhaust pathway with a fourth sensor to provide an exhaust signal corresponding to the air/fuel ratio of a combusted mixture of air and fuel, and said valve control signal is further provided in accordance with said exhaust signal; and further comprising:

a mixer in fluid communication with said pathway, said fuel line, and said manifold, said mixer providing a mixture of fuel and air to said manifold;

a throttle valve in fluid communication with said mixer and said manifold and being positioned therebetween to regulate flow of the mixture to said manifold;

a fifth sensor providing a fifth signal corresponding to position of said throttle valve, said controller being responsive to said fifth signal to further control performance of said engine.

22. The system of claim 21, wherein said controller includes means for determining a target fuel mass flow rate from said exhaust signal and a target air/fuel ratio.

23. The system of claim 22, wherein said controller includes means for compensating for transient operation of said engine.

24. The system of claim 17, wherein said engine has an exhaust pathway with a fifth sensor to provide an exhaust signal corresponding to air/fuel ratio of a combusted mixture of air and fuel, and said valve control signal is further provided in accordance with said exhaust signal.

25. The system of claim 17, wherein said controller includes means for compensating for transient operation of said engine.

26. The system of claim 18, wherein said controller includes means for determining a target fuel mass flow rate from said exhaust signal and a target air/fuel ratio.

* * * * *